United States Patent
Haas et al.

(10) Patent No.: US 10,220,719 B2
(45) Date of Patent: Mar. 5, 2019

(54) EVSE-BASED ENERGY AUTOMATION, MANAGEMENT, AND PROTECTION SYSTEMS AND METHODS

(71) Applicant: Siemens Industry, Inc., Alpharetta, GA (US)

(72) Inventors: Harry Price Haas, Atlanta, GA (US); Paul Terricciano, Roswell, GA (US); Sesha Yeruva, Duluth, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 218 days.

(21) Appl. No.: 14/749,744

(22) Filed: Jun. 25, 2015

(65) Prior Publication Data

US 2016/0137087 A1 May 19, 2016

Related U.S. Application Data (60) Provisional application No. 62/080,483, filed on Nov. 17, 2014.

(51) Int. Cl.
*H02J 7/00* (2006.01)
*B60L 11/18* (2006.01)
(Continued)

(52) U.S. Cl.
CPC ....... *B60L 11/1848* (2013.01); *B60L 11/1824* (2013.01); *B60L 11/1838* (2013.01);
(Continued)

(58) Field of Classification Search
CPC .............. B60L 11/1838; B60L 11/1848; B60L 11/1824; B60L 11/1844; B60L 11/1851; H02J 3/14; H02J 7/02
(Continued)

(56) References Cited

U.S. PATENT DOCUMENTS 7,693,809 B2   4/2010  Gray
7,956,570 B2   6/2011  Lowenthal et al.
(Continued)

FOREIGN PATENT DOCUMENTS

JP   2010189592 A   9/2010
JP   2012050236 A   3/2012
(Continued)

OTHER PUBLICATIONS

Translation of Japanese Office Action dated Dec. 1, 2016 corresponding to Japanese Application No. 2015-223646 filed Nov. 16, 2015 (37 pages).
(Continued)

*Primary Examiner* — Zixuan Zhou (57) ABSTRACT

In one or more embodiments, electrical supply systems including Electric Vehicle Supply Equipment (EVSE) are provided. The EVSE includes a communication gateway that provides internet accessibility by a user through an EVSE server. In some embodiments, the EVSE allows communication with other smart devices, and/or communication of status of loads coupled to a load center. The user or the utility service provider can perform, through the EVSE server, energy management and home automation tasks using this communication gateway of the EVSE and may send control signals to smart devices through the EVSE. This EVSE may also provide a protection mechanism for smart devices coupled to the load center in case of emergencies like brown-outs or power surges on the electric grid. Methods of operating the system and EVSE are provided, as are other aspects.

19 Claims, 4 Drawing Sheets

(51) Int. Cl.
  *H02J 3/14* (2006.01)
  *H02J 7/02* (2016.01)

(52) U.S. Cl.
  CPC ....... *B60L 11/1844* (2013.01); *B60L 11/1851* (2013.01); *H02J 3/14* (2013.01); *H02J 7/02* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01)

(58) Field of Classification Search
  USPC ............................................ 320/109; 701/22
  See application file for complete search history.

(56) References Cited

U.S. PATENT DOCUMENTS

| | | | |
|---|---|---|---|
| 8,138,715 B2 | 3/2012 | Lowenthal et al. | |
| 8,432,131 B2 | 4/2013 | Baxter | |
| 8,736,224 B2 | 5/2014 | Gale et al. | |
| 8,796,881 B2 | 8/2014 | Davis | |
| 8,866,436 B2 | 10/2014 | Baxter | |
| 8,872,480 B2 | 10/2014 | DeBoer | |
| 2002/0116282 A1 | 8/2002 | Martin | |
| 2008/0281663 A1 | 11/2008 | Axelrod | |
| 2010/0017045 A1* | 1/2010 | Nesler | B60L 11/1824 700/296 |
| 2010/0256781 A1* | 10/2010 | Sheu | H04L 67/125 700/3 |
| 2011/0037429 A1 | 2/2011 | DeBoer | |
| 2012/0112697 A1 | 5/2012 | Heuer | |
| 2012/0194128 A1 | 8/2012 | Laberteaux | |
| 2013/0002099 A1 | 1/2013 | Jafa et al. | |
| 2013/0020992 A1 | 1/2013 | Wu | |
| 2013/0021162 A1 | 1/2013 | DeBoer | |
| 2013/0026986 A1 | 1/2013 | Foslien | |
| 2013/0110296 A1 | 5/2013 | Khoo et al. | |
| 2013/0141040 A1* | 6/2013 | DeBoer | B60L 11/1838 320/109 |
| 2014/0036989 A1 | 2/2014 | Heinrich | |
| 2014/0062401 A1* | 3/2014 | Gadh | B60L 11/1838 320/109 |
| 2014/0125279 A1 | 5/2014 | Juhasz | |
| 2014/0152256 A1 | 6/2014 | Lowenthal | |
| 2014/0203077 A1 | 7/2014 | Gadh et al. | |

FOREIGN PATENT DOCUMENTS

| | | |
|---|---|---|
| JP | 2013065265 A | 4/2012 |
| JP | 2014050275 A | 3/2014 |
| WO | 2012039055 A1 | 3/2012 |

OTHER PUBLICATIONS

European Search Report dated Mar. 21, 2016 corresponding to European Application No. 15189763.4 filed Oct. 14, 2015 (9 pages).
Wei Dong and Harry Haas. Smart Grid Capable Electric Vehicle Supply Equipment (EVSE) for Residential Applications (12 pages).

* cited by examiner

EVSE-BASED ENERGY AUTOMATION, MANAGEMENT, AND PROTECTION SYSTEMS AND METHODS

RELATED APPLICATIONS

The present application claims priority to U.S. Provisional Application No. 62/080,483 entitled "EVSE BASED ENERGY AUTOMATION, MANAGEMENT AND PROTECTION SYSTEM" filed on Nov. 17, 2014, which is hereby incorporated by reference in its entirety and for all purposes herein.

FIELD

The present invention relates to Electric Vehicle Supply Equipment (EVSE) configured for charging of an electric vehicle (EV), and more specifically to a smart EVSE and electrical supply systems including same.

BACKGROUND

Future demand for charging of EVs may place a significant additional burden on the electric grid. With random points on the electric grid charging EVs, especially during peak hours, there is a risk of not only grid instability, but possibly also increased energy costs for the consumer (hereinafter the "user"). Existing smart grid compatible devices (including smart EVSE) may interface with a building energy management or automation system (e.g., home or office energy management system). However, such existing EVSE are inadequate in some instances, especially for retrofit.

Accordingly, there is a need for improved smart EVSE and systems including same.

SUMMARY

In some embodiments, an electrical supply system for an electric vehicle (EV) is provided. The electrical supply system includes an EVSE cloud server configured to be accessible by a user; an internet access device configured to communicate with the EVSE server through an internet connection; and an electric vehicle supply equipment (EVSE), comprising a charge control device that is configured to communicate a maximum charge current to be drawn by the EV, a metering device configured to communicate charge data comprising one or more of charge voltage, charge current drawn by the EV, charge power consumed by charging the EV, and charge energy, a communications interface receiving the charge data, and a communication gateway in the EVSE, the communication gateway configured to send information to the EVSE server through the internet access device including the charge data, and receive one or more charge control signals from the EVSE server.

In one or more embodiments, an electric vehicle supply equipment (EVSE) is provided. The EVSE includes a charge control device configured to communicate a maximum current drawn by the electric vehicle, a metering device configured to generate charge data of an electric vehicle (EV) of one or more of charge voltage, charge current drawn by the EV, charge power consumed by charging the EV, and charge energy, and a communication gateway integral with the EVSE and configured to communicate with an EVSE server, the communication gateway further configured to interface with the one or more smart devices.

In one or more embodiments, an electric vehicle supply equipment (EVSE) is provided. The EVSE includes a charge control device configured to limit a maximum current drawn by the electric vehicle; a communication gateway integral with the EVSE and configured to interface with one or more monitoring devices that measure load data on one or more branch circuits of a load center, and an EVSE server.

In one or more embodiments, a method of operating electric vehicle supply equipment (EVSE) is provided. The method includes providing an EVSE including a communication interface, measuring one or more of line voltage, line current, line phase, and line frequency of a load center from which the EVSE is receiving power, determining a brown-out or power surge condition based on one or more of the line voltage, line current, line phase, and line frequency, and commanding with the EVSE to shut-off one or more smart devices coupled to the load center.

Still other aspects, features, and advantages of the invention may be readily apparent from the following detailed description wherein a number of example embodiments are described and illustrated, including the best mode contemplated for carrying out the invention. The invention may also be capable of other and different embodiments, and its several details may be modified in various respects, all without departing from the scope of the invention. The invention covers all modifications, equivalents, and alternatives falling within the scope of the invention.

BRIEF DESCRIPTION OF THE DRAWINGS

Features of embodiments of the present invention can be more clearly understood from the following detailed description considered in conjunction with the following drawings, in which the same reference numerals denote the same elements throughout. The drawings and descriptions are to be regarded as illustrative in nature, and not as restrictive. The drawings are not necessarily drawn to scale.

DESCRIPTION

With a rise in demand for EVs, it is estimated that very soon almost 10% of transportation energy with be met by the electric grid (e.g., approximately 1 trillion kWh or more). Even though the existing electrical grid may be able to manage this additional load during non-peak hours, charging of EVs during peak-hours at random points on the electrical grid may possibly cause grid instability, and may possibly cause electrical brown-out conditions (hereinafter "brown-outs"). Currently, a utility service provider (utility company) may manage this additional power demand on the electric grid through various energy management programs with consumers, such as a "demand response program." A "demand response program" provides an opportunity for a consumer to play a role in the operation of the electric grid by reducing and/or shifting their electricity usage during periods of peak demand in response to time-based electrical rates or other forms of financial incentives.

For a particular residential or commercial (hereinafter collectively or individually referred to as a "building") that has charging capability for an electric vehicle (EV), a smart EVSE that is internet accessible may provide a suitable way, according to one or more embodiments, to provide integrated energy management, and/or a means to implement a demand response program. Such a smart EVSE may allow, in some embodiments, the option of controlling charging time and/or charging rates of a smart EV based upon peak electrical demand on the electric grid.

Additionally, a smart EVSE according to some embodiments may provide a mechanism for demand response management when one or more high power loads of a branch circuit coupled to a load center of the building is operating (ON) during the same period as when the smart EVSE is charging. A charging rate or charging time of the EVSE may be adjusted, or the current drawn by the one or more high power loads, may be adjusted responsive to one or more charge control signals from the smart EVSE or from an EVSE server. Advantageously, avoiding or limiting EV charging or limiting current drawn by one or more high power loads during peak demand hours may result in lowered utility bills, and possibly even reduce grid instability.

Furthermore, the smart EVSE, according to one or more embodiments, may take the place of an automated home energy system, wherein the smart EVSE includes communication capability that may be operable to interface directly with one or more smart devices, and a communication gateway configured to access an EVSE server on the internet. This communication capability allows for ease of retrofit to existing buildings that lack an automated home energy system. In short, the EVSE becomes the platform for communication with one or more smart devices.

In some embodiments, the smart EVSE may interface directly with some or all smart devices (e.g., smart appliances, smart lighting, smart heating, ventilating and air conditioning (hereinafter "smart HVAC"), smart windows and doors, smart outlets, and the like) that may be enrolled in a demand response program (e.g., an automated demand response program). In this way, the need for a separate home automation system is avoided, and monitoring and/or control of the one or more smart devices may take place through the smart EVSE. In this embodiment, the smart EVSE acts as a gateway for accessing the internet and for communication with the user concerning the operational condition and/or control of the one or more smart devices.

Communication between the smart EVSE and the one or more smart devices of the building may be based upon communication protocols such as Z-wave, ZigBee, HOMEPLUG® technology (also known as Powerline or PLC), HOMEPLUG® Green PHY™, or the like. In some embodiments, the smart EVSE will be capable of interfacing with, and obtaining electrical usage data from, the one or more smart devices. In other embodiments, the smart EVSE will be capable of protecting the electrical supply system and the one or more smart devices, as well as the EVSE itself, against brown-outs or power surges caused by grid instability. This may be accomplished by controlling power drawn by such smart devices through control signals from the smart EVSE and/or by communicating the maximum current available to be drawn by the EV.

In one or more embodiments, a smart EVSE is provided that provides a common platform to manage and protect other loads coupled to the load center, and for possibly providing load control that may be integrated with outage management or demand response management. In some embodiments, charging schedules for the EV may also be implemented through the smart EVSE and an EVSE server. Load priorities may be set by a user through the smart EVSE by communication with an EVSE server. Should a demand response program be implemented, then the user can decide on and preset the priorities of electrical loads to turn off first in order to meet a goal set by the demand response management, or otherwise predetermine and set a load sharing profile or schedule.

One or more embodiments may include a smart EVSE in a building that has capability to communicate with a user (e.g., residential or commercial space owner or lessee) and optionally with an energy management system coupled to the electric grid through an EVSE server. User communication with the smart EVSE may be with a communication device (e.g., mobile device or cell phone) through the use of an application (hereinafter "app") to provide internet-based access and control of various functions of the smart EVSE in some embodiments. In some embodiments, communication may be through a computer (e.g., laptop). In some embodiments, charging schedules for the EV may also be implemented through communication with user through the EVSE server communicating with the smart EVSE. In one or more embodiments, the EVSE server may also be accessible by a utility server that has received electrical usage data from the electrical grid. The utility server may request the EVSE to reduce power consumption of the building. Thus, the EVSE may receive a control signal from the EVSE server to lower maximum charge current or charging time, or other control signals to control power usage of other smart devices. Likewise, charge data and/or electricity usage data may be communicated from the EVSE server to the smart EVSE and may be accessed by the user and/or the utility server.

Thus, the smart EVSE may further initiate and perform peak demand power limiting for the building. This may possibly save the customer on energy costs, and/or reduce the possibility of sudden spikes in demand at random points on the electric grid. In particular, the smart EVSE may reduce an impact of grid instability on other electric devices provided as electrical loads on one or more electrical branches coupled to a load center of the building. In some embodiments, the utility service provider may detect a brown-out, and then send a command to the EVSE server to modify (limit) electrical demand. Hence, the EVSE server may send one or more control signals to the smart EVSE that may be used to protect other electrical loads, smart devices, and/or charging of the EV, by shutting off or modulating one or more electrical loads.

In some embodiments, the peak power limiting may be based upon pre-set priorities, load control, or charging schedules. Thus, one or more embodiments of the smart EVSE may address the need for a common platform that integrates multiple smart devices to perform energy management of the building through a communication gateway that is embedded into, and is integral with, the smart EVSE.

These and additional embodiments of the electrical supply systems including a smart EVSE, smart EVSEs, methods of operating an EVSE, as well methods allowing implementation of demand response management are described in detail with reference to FIGS. 1-4 herein.

Figure 1:
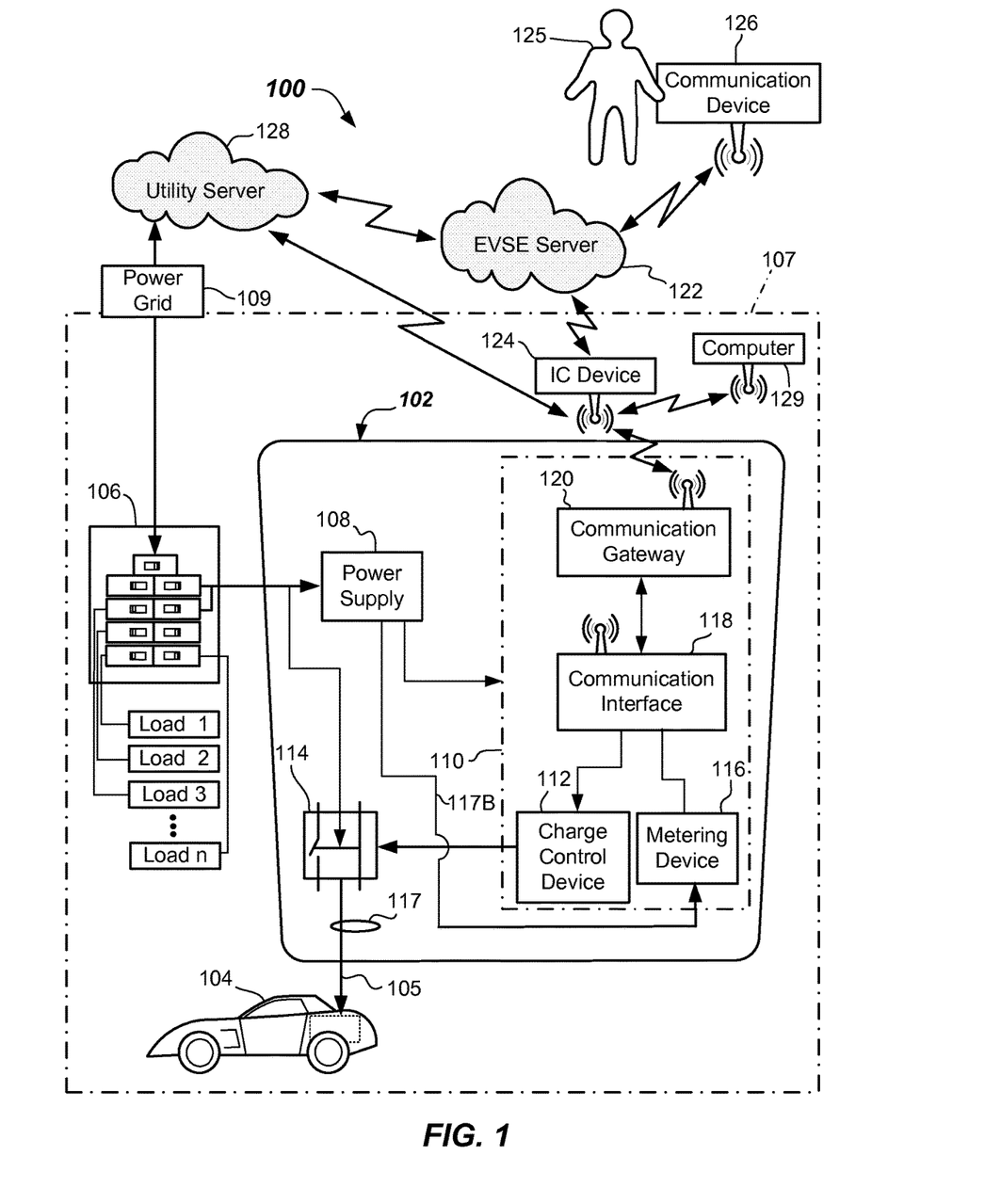
FIG. 1 illustrates a schematic diagram of an electric supply system including a smart EVSE according to one or more embodiments.

Referring now to FIG. 1, a first embodiment of an electrical supply system 100 for an EV 104 including a smart EVSE 102 is provided. Smart EVSE 102 is configured to couple to, and electrically charge, a power storage device (e.g., battery or batteries—shown dotted) of the EV 104. EV 104 may be a fully-electric vehicle, as well as a hybrid vehicle. Electrical charging may be supplied to the EV 104 by the charging cable 105 having an electrical connector (not shown) that electrically couples to a receiving connector (not shown) on the EV 104.

The smart EVSE 102 may be electrically coupled to a load center 106 (e.g., a panel box including circuit breakers, or the like) of a building 107 (shown dotted). However, in some instances, the smart EVSE 102 may be outside of the building 107. Smart EVSE 102 may be coupled as an electrical load on one branch electrical circuit and may receive electrical power from the load center 106. Load center 106 may be connected to the power grid 109. A typical load center 106 may have a 240V, 200 A service, for example. However, other load center types and sizes may be used for supplying the smart EVSE 102. Other electrical branch circuits containing one or more electrical loads (loads 1-n) may also be coupled to the load center 106. Any suitable number of branch circuits may be connected based upon the rating and size of the load center 106. One or more of the branch circuits may also couple to and include one or more subpanels.

As will be apparent from the following, in some embodiments, one or more of these electrical loads may be smart devices (e.g., smart appliances, smart lighting, smart heating, smart HVAC, smart windows and doors, smart outlets, and the like). The term "smart device" as used herein means any electrical device that may be remotely monitored and/or remotely controlled via a communication network. Each electrical branch of the load center 106 may be protected by a suitable circuit breaker of the load center 106.

In more detail, the smart EVSE 102 may include a power supply 108 configured to provide electrical power sufficient for the various control, metering, processing, and communication components of the smart EVSE 102, to be described later herein. Power supply 108 may be a 240V, 100 mA power supply, for example. Other suitable types and sizes of power supply 108 may be used. The smart EVSE 102 may include a printed circuit board 110 (shown dotted) including multiple interconnected microprocessors, electrical circuits, and components thereon.

In the depicted embodiment, the smart EVSE 102 may include a charge control device 112 that is operable to process a control signal (e.g., a charge signal) representative of a maximum electrical charge current to be communicated to the EV 104, and that charge signal may be received from a communication interface 118. The charge control device 112 may communicate the maximum electrical charge current that can be drawn by the EV 104 through charge cable 105. Charge control device 112 may also open and close a contactor 114 under certain conditions, such as when a pause or delay charge request is received or when a scheduling request or control signal of a demand request from a user 125 or utility server is received. Contactor 114 may electrically couple to charging cable 105, which may include a SAE J1772 connector, or the like that is coupled to the EV 104. Contactor 114 may be a 2-pole or 4-pole type. Charge control device 112 includes a low-power microcontroller that controls the contactor 114 based on a state of or user request to the EVSE 102. It also communicates information concerning the EVSE 102 to the user via the communication interface 118 may be a low-power microcontroller.

Smart EVSE 102 may include a metering device 116 that is operable to receive charging information, such as from a sensor 117A and/or voltage tap 117B in the smart EVSE 102. Sensor 117A may be a single sensor or a combination of sensors able to measure charging current and voltage tap 117B may be able to measure charging voltage. Phase of the incoming A and B phases may also me measured. In one or more embodiments, the sensor 117A may be a current transformer, for example, and may provide to the metering device 116 a measure of electrical current drawn by the EV 104. In one or more embodiments, a measure of voltage may be provided to the metering device 116 from voltage tap 117B, which may be a stepped-down voltage measure from the power supply 108. The metering device 116 may then calculate one or more of charge current or charge voltage, for example.

Metering device 116 may also function to calculate one or more additional usage parameters, such as charge power usage or charge energy usage, such as from the measured values of charge current and/or charge voltage. Metering device 116 may be a system on chip (SoC), which is an integrated circuit (IC) that may integrate all components of a computer or other electronic system into a single chip. It may contain digital, analog, mixed-signal, and even radio-frequency functions, and memory all on a single chip substrate. In particular, the metering device 116 may be an 8051 microcontroller in some embodiments. Other suitable microcontrollers may be used. Charging data such as one or more of charge current, charge voltage, charge power usage, charge energy usage, and combinations of the foregoing may be stored in memory of the metering device 116 and one or more of these may be communicated periodically from the smart EVSE 102. Communication may be performed in periodic intervals, such as about every 30 seconds for example. Other intervals may be used.

The smart EVSE 102 may include a communication interface 118 that is configured and functional to allow internal communication between the various other EVSE components, such as the other microcontrollers (e.g., charge control device 112, metering device 116, and communication gateway 120). For example, the communication interface 118 may facilitate data communication between the metering device 116 and the communication gateway 120. Communication may include transmission and communication of charging data such as one or more of charge current, charge voltage, charge power, charge energy, or combinations of the foregoing from the metering device 116 to the communication gateway 120. Communication packets may be sent in incremental periods, as discussed above. Likewise, in some instances, maximum charge current to be drawn by the EV 104 may be communicated as a control signal by the communication gateway 120 to the charge control device 112. Communication interface 118 may be a 32-bit processor, such as an ARM® CORTEX®-M3 processor or the like. Other suitable processor types may be used.

Communication interface 118 may communicate with the other devices of the smart EVSE 102 (e.g., charge control device 112, metering device 116 and communication gateway 120) via one or more modular communications interface (MCI) such as specified by ANSI/CEA-2045, for example. Other communication protocols may be used. Communication between the communication interface 118 and the metering device 116 may be by serial communication or the like by use of one or more universal asynchronous receiver-transmitters (UART), which is a computer component that handles asynchronous serial communication. Communication between the communication interface 118 and the communication gateway 120 and between the communication interface 118 and the charge control device 112 may be by Serial Peripheral Interface (SPI). SPI is a synchronous serial communication interface specification used for short distance communication. Other forms of inter-component electronic communication may be used.

In some embodiments, the communication interface 118 may optionally include host architecture in support of a wireless network technology, such as ZigBee, 6LoWPAN IPv6, DASH-7, Z-Wave, EnOcean, IP-based standards under IEEE 802.15, or the like. In some embodiments, the communication interface 118 may be a CC2538 SoC available from Texas Instruments with resident communication capability. Other suitable system-on-chip architectures may be used, including those having host architecture in support of a wireless network technology or other LAN technology such as Ethernet or over PLC.

As should be apparent, the communication interface 118 may provide suitable architecture within the smart EVSE 102 to allow data communication with other smart devices that operate on a wireless personal area network (WPAN) near the smart EVSE 102. Such smart devices may include smart appliances, smart HVAC, and/or smart lighting, smart windows and doors, smart outlets, and the like. Communication between one or more smart devices and the communication interface 118 may be one-way receiving, such as receiving status information regarding the one or more smart devices. Status information may include communication packets indicating that the smart device is on, off, or other electrical usage data such as drawn current, voltage, or power or energy usage in some embodiments. Communication between the one or more smart devices and the communication interface 118 may be one-way sending in some embodiments, i.e., sending communication packets to the one or more smart devices to control the one or more smart devices (e.g., to turn them on or off or otherwise modulate a setting thereof (e.g., a power consumption setting).

Communication gateway 120 provides a gateway for communication of the smart EVSE 102 with an EVSE server 122, such as through the internet. EVSE server 122 may be a cloud server accessed by the user 125 of the smart EVSE 102 via a communication device 126. EVSE Server 122 may be based on Microsoft® C-sharp programming, for example. EVSE server 122 may include a large data table including data on the smart EVSE 102 and the user 125, including charge data and control signals with timestamps, priority data, schedules, access keys, user IDs, e-mails, and passwords. Data table may also include load information concerning load data for smart devices coupled to the load center 106. Communication gateway 120 may, in some embodiments, allow wireless communication over a wireless local area network (WLAN), such as with the use of an internet communication device 124, such as a modem. Internet communication device 124 may communicate using Wi-Fi based on the IEEE 802.11 standard, BLUETOOTH, THREAD, ALLSEEN ALLIANCE, or other suitable wireless communication protocols. In some embodiments, the internet communication device 124 may interface with a local router (not shown), which may be a wireless router, to allow operation of the wireless communication protocol. In some embodiments, a wireless router function and modem capability may be integrated into a hybrid device. Internet communication device 124 may be any suitable communication device configured to allow access to the internet, such as through cable (cable modem), or through optical fiber (fiber-optic modem), for example. Other types of internet access may be provided.

In some embodiments, the communication capability with the EVSE server 122 may be through the internet as accessed by 3G or 4G or any other mobile communications standard that allows cell phones, computers, and other portable electronic devices to access the Internet wirelessly, for example. In this instance the internet communication device 124 may be integrated into the communication gateway 120, rather than being a separate device.

Communication gateway 120, which is integral in the smart EVSE 102, may allow for two-way communication with the internet communication device 124 over a WLAN, in some embodiments. In some embodiments, a Wi-Fi protocol per 802.11a-ac may be used (including but not limited to 802.11a, 802.11b, 802.11g, 802.11 n, 802.11 ab, or the like). As discussed above, the communication gateway 120 may be used to communicate with the EVSE server 122 through the internet communication device 124 such that signal packets that may be communicated to and from the smart EVSE 102. Data packets may be communicated to the EVSE server 122 and control packets may be received from the EVSE server 122.

In some embodiments, the communication gateway 120 may be used to communicate charging data with the EVSE server 122, as heretofore described. This EVSE server 122 may receive charging data from, and communicate with, other smart EVSEs coupled to the power grid 109. A single EVSE server 122 may be communication with hundreds or thousands of smart EVSEs like smart EVSE 102. Multiple EVSE servers 122 may be provided to communicate with different areas of the power grid 109. The charging data that is sent periodically may be stored in memory of the EVSE server 122 and may, in some embodiments, be accessed by a user 125 via a communication device 126. In one or more embodiments, the charging data may be accessed from the EVSE server 122 by a utility server 128 and compiled to gain understanding of the amount of load being drawn in respective areas of the power grid 109 and by what types of devices.

Communication device 126 may be a mobile device such as a cell phone, tablet, phablet, or the like that is capable to access the EVSE server 122, such as by using a mobile communication standard such as 3G, 4G, or the like. The user 125 may operate an application (hereinafter "app") that is downloaded to the communication device 126. The App may be written in JavaScript using a framework such as Apache Cordova™ or an object-oriented language such as Objective-C for OS X and iOS for Apple. Using the App, the user 125 may access the charging data. Charging data may include one or more of charge voltage, charge current drawn by the EV 104, charge power consumed by the smart EVSE 102 in carrying out the charging of the EV 104, and/or charge energy consumed by the smart EVSE 102. Electrical rate information may also be accessed using the App. Furthermore, in some embodiments, the user 125 may operate the smart EVSE 102 through control signals communicated through the EVSE server 122 to the smart EVSE 102. Thus, the user 125 may start, pause or delay (e.g., by 2 hrs., 4 hrs., 6 hrs., or the like) charging of the EV 104. The user 125 may create charge schedules for the smart EVSE 102. User 125 may receive through the App demand response requests (an event). The user 125 may send a control signal instructing the smart EVSE 102 of the maximum current available to be drawn by the EV 104. This maximum current may be communicated to the inverter of the EV 104. In some embodiments, the IP address of the smart EVSE 102 may be accessed directly by a computer 129 to change settings of the smart EVSE 102. Computer 129 may be wirelessly communicate with the internet communication device 124 or may be hard wired thereto.

In one or more embodiments, the communication gateway 120 may be configured and operable to receive certain data (e.g., signal packets) from the EVSE server 122. For example, on one or more embodiments, the data received from the EVSE server 122 may concern at least one of: load control, charging schedules, and charging priorities.

For example, information concerning load control may include receiving one or more signals to shut off or lower the energy consumed by the smart EVSE 102 (e.g., HIGH, LOW or OFF). In other embodiments, as will be apparent from the discussions relative to FIGS. 2 and 3, one or more electrical loads based on an energy demand program may be shut off or otherwise limited or modulated (e.g., HIGH, LOW, OFF, or other %). The energy demand program may be implemented through requests made to the EVSE server 122, or through communication directly with the smart EVSE 102. Communication directly with the smart EVSE 102 may be made by Open Automated Demand Response (ADR) communication protocol with the utility server 128. Thus, demand requests to shut off or otherwise limit or modulate (e.g., HIGH, LOW, OFF, or other %) may be made directly to the smart EVSE 102 in some embodiments.

Pre-set user priorities may be used to shut off or otherwise limit or modulate (e.g., HIGH, LOW, OFF, or other %) certain desired loads based upon which loads have been assigned priority. The ultimate goal of the load control would be to never exceed a preset peak power demand for the smart EVSE 102 or building 107, so as to avoid excessive utility rate and/or to avoid causing grid stability issues. Load control may be implemented while carrying out user priorities.

In some embodiments, the user 125 may set charging schedules regarding at what times, for how long, and at what maximum charge (e.g., Amps or % of full charge) to allow the smart EVSE 102 to charge the EV 104. The schedules may be set using the App and the communication device 126 or through communication directly with the smart EVSE 102 via a computer 129 and the home area network including the internet communication device 124.

In some embodiments, the user 125 may set priorities so as to allow a particular electrical load to be powered over another (e.g., take precedence over) based upon the preference of the user 125. In other embodiments, a demand request received from the utility server 128 may be implemented based on the pre-set user priorities.

For example, if the user 125 wants to charge the EV 104 during the day (during peak demand hours) rather than at night, the user 125 may shut off a smart device (e.g., smart HVAC) by assigning it a priority 2 while charging the EV 104 by setting the smart EVSE to priority 1. Other priorities may be set for smart devices in the electrical supply system. For example, in some embodiments, when the EVSE 102 is set to priority 1 and smart HVAC is set to priority 2, various operational levels may be set for each. For example, for Choice 1, the smart EVSE 102 may charge at a percentage (e.g., 80%) of max charge level, while allowing the smart HVAC to run at low capacity. For Choice 2, the smart EVSE 102 may charge a certain percentage (e.g., 80%) of the time within a time period, while allowing the smart HVAC to run only a smaller percentage (e.g., 20%) of the time. Optionally, if the smart HVAC is set as priority 1 and smart EVSE 102 is set as priority 2, a charge level of the smart EVSE 102 may be lowered, or the smart EVSE 102 may only charge the EV 104 when the smart HVAC is not running. In other embodiments, percentage distribution of energy consumption by each load may be set. In some embodiments, the smart EVSE 102 can assign priorities to loads in an "auto priority mode" to balance the total load based on set priorities. Priorities may be set based upon user preferences.

In some embodiments, based on the load profiles, i.e. percentage distribution of energy consumption by each load, the smart EVSE 102 can assign priorities to loads in an "Auto priority mode" to balance the total load and maintain a fixed peak demand. For example, if the EV 104 needs to be charged during the peak demand hours, another high power load like a HVAC system could be shut-off or reduced by assigning a higher priority to the smart EVSE 102. The following are a few example scenarios how priorities can be utilized. When smart EVSE 102 is set to priority 1 and HVAC system to priority 2, then Choice 1 is that the smart EVSE 102 charges at 80% of max charge level, allowing the HVAC system to run at minimum capacity, and Choice 2 is that smart EVSE 102 charges 80% of the time within a period of 3 hours, allowing the HVAC system to run 20% of the time. If the HVAC system is priority 1 and smart EVSE 102 is set to priority 2, the charge level on the smart EVSE 102 can be lowered or even shut off when the HVAC system is running.

Figure 2:
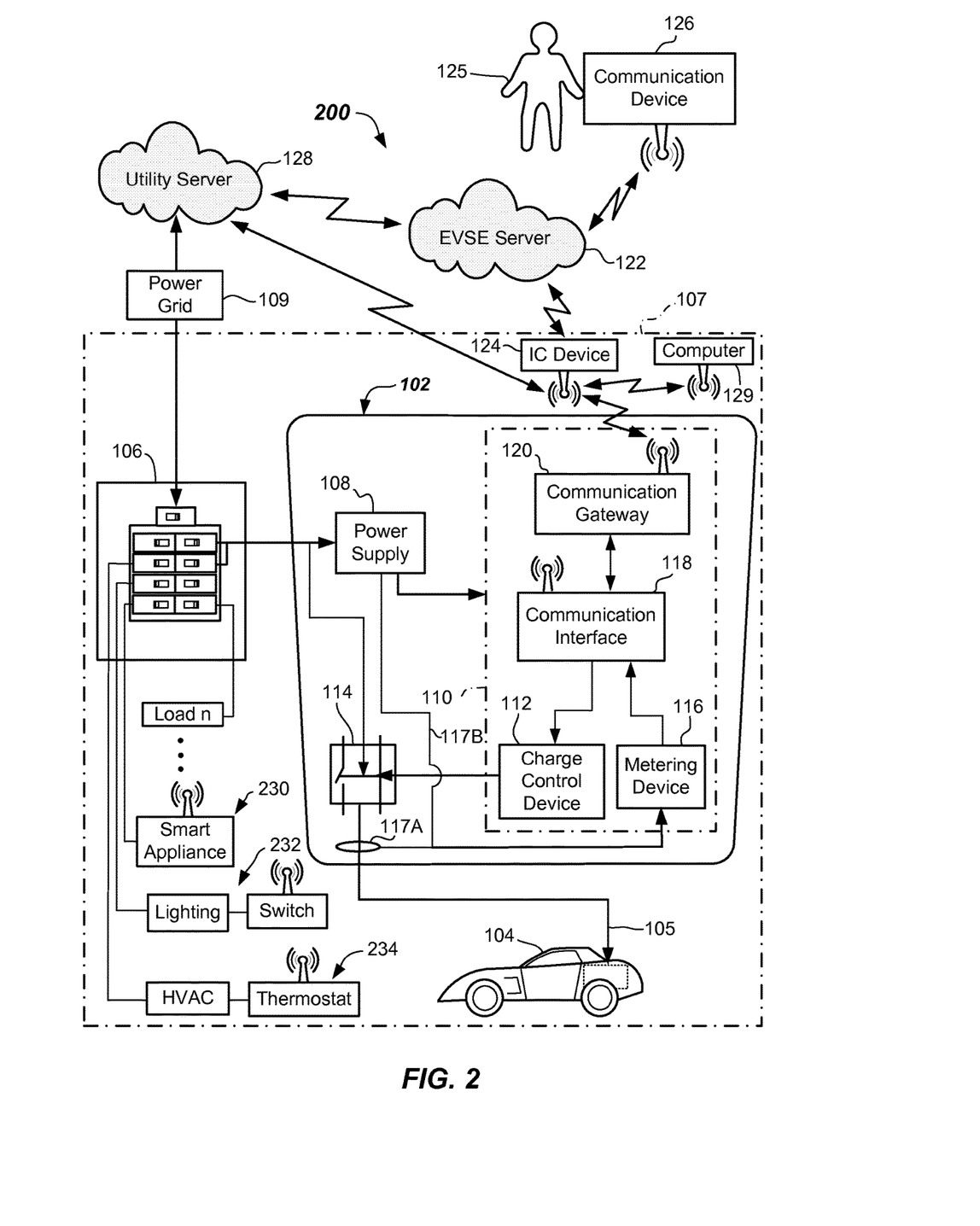
FIG. 2 illustrates a schematic diagram of an electric supply system including a smart EVSE that is configured to communicate with one or more smart devices according to one or more embodiments.

FIG. 2 illustrates another embodiment on an electrical supply system 200 including the smart EVSE 102. This electrical supply system 200 includes the components previously discussed, and includes the capability of communication with one or more smart devices. In this embodiment, the smart EVSE 102 may communicate directly with smart devices coupled as electrical loads to the load center 106. For example, several smart devices are shown coupled to the load center 106, such as a smart appliance 230, smart lighting 232, and smart HVAC 234. Other types or numbers of smart devices may be provided in the electrical supply system 200 and may communicate directly with the smart EVSE 102. Thus, the smart EVSE 102 may function as the conduit to allow monitoring and/or control of the one or more smart devices, such as a smart appliance 230, smart lighting 232, and smart HVAC 234.

The communication gateway 120 may allow communication with the one or more smart devices 232 234, 236. The communication may include receiving control commands from the EVSE server 122, or sending usage or status information of the one or more smart devices 232 234, 236 to the EVSE server 122. Communication may be through the communication interface 118 in some embodiments. Any suitable wireless protocol such as Z-wave, ZigBee, EnOcean, DASH-7, 6LoWPAN IPv6, or other standards operating on a WPAN may be used. However, optionally, the communication interface 118 may use other communication protocols such as HOMEPLUG® technology (also known as Powerline or PLC), HOMEPLUG® Green PHY™, or the like.

In embodiments where the smart EVSE 102 interfaces with, and obtains electrical usage data from, one or more of these smart devices 230, 232, 234, the usage data may include current, voltage, power, and/or energy. Status information may be communicated to the communication interface 118, and that information may be communicated to the EVSE server 122 by the communication gateway 120 through the internet communication device 124. Status information may include signal packets indicating that the smart device is ON, OFF, or at a particular modulation state (e.g., high, Low, 1-10, 0-100%, or the like). In some embodiments, the smart EVSE 102 may send signal packets communicating an adjustment to a state setting of the smart device (e.g., an energy mode, a frequency setting for period of ON and OFF, and the like).

For example, a smart appliance 230 may have multiple energy modes of operation (e.g., HIGH, LOW, OFF, or other), and the smart EVSE 102 may send and receive signal packets communicating or adjusting an energy mode. Similarly, smart lighting 232 may have dimming capacity and the smart EVSE 102 may send and/or receive signal packets adjusting a dimming level, and may also turn the smart lighting 232 ON and OFF. The smart HVAC 234 may have the ability to adjust an ON or OFF frequency (e.g., run between 0%-100% of the time) or adjusting an energy mode (e.g., between HIGH or LOW).

In each instance, the communication gateway 120 connects to the EVSE server 122 through the internet communication device 124 to receive and communicate signal packets (e.g., ON, OFF, or modulation requests) from the user 125 via using the App. Thus, this embodiment provides a system architecture that allows for controlled charging of the EV 104 as well as energy management of smart devices (e.g., 230, 232, 234) sharing the load center 106 with the smart EVSE 102.

The smart EVSE 102 can also communicate with the utility server 128. Communication may be directly between the utility server 128 and the internet communication device 124 using Open ADR, or more likely between the EVSE server 122 and the utility server 128. In some embodiments, the utility server 128 may sense an unwanted power condition (e.g., a brown-out) on the power grid 109 and may then send a demand response request to the EVSE server 122. The EVSE server 122 may then communicate control signals to the smart EVSE 102 to adjust the total demand allowed for the smart EVSE 102 and any smart devices 230, 232, 234 coupled to the load center 106. The control signals may involve shutting OFF certain loads, and/or modulating certain loads in order to meet the demand response request from the utility server 128. The response to the demand response request may be to implement the preset priorities established by the user 125.

The EVSE server 122 may maintain a database of status information (ON, OFF, and/or modulated state) for each smart device capable of communicating with the smart EVSE 102. The EVSE server 122 may also receive and store charge data from the smart EVSE 102 and/or electrical usage data on the one or more smart devices (e.g., 230, 232, and 234). This data may be accessible from the EVSE server 122 over the internet by the user 125 via the App operating on the communication device 126 or optionally from the computer 129.

Figure 3:
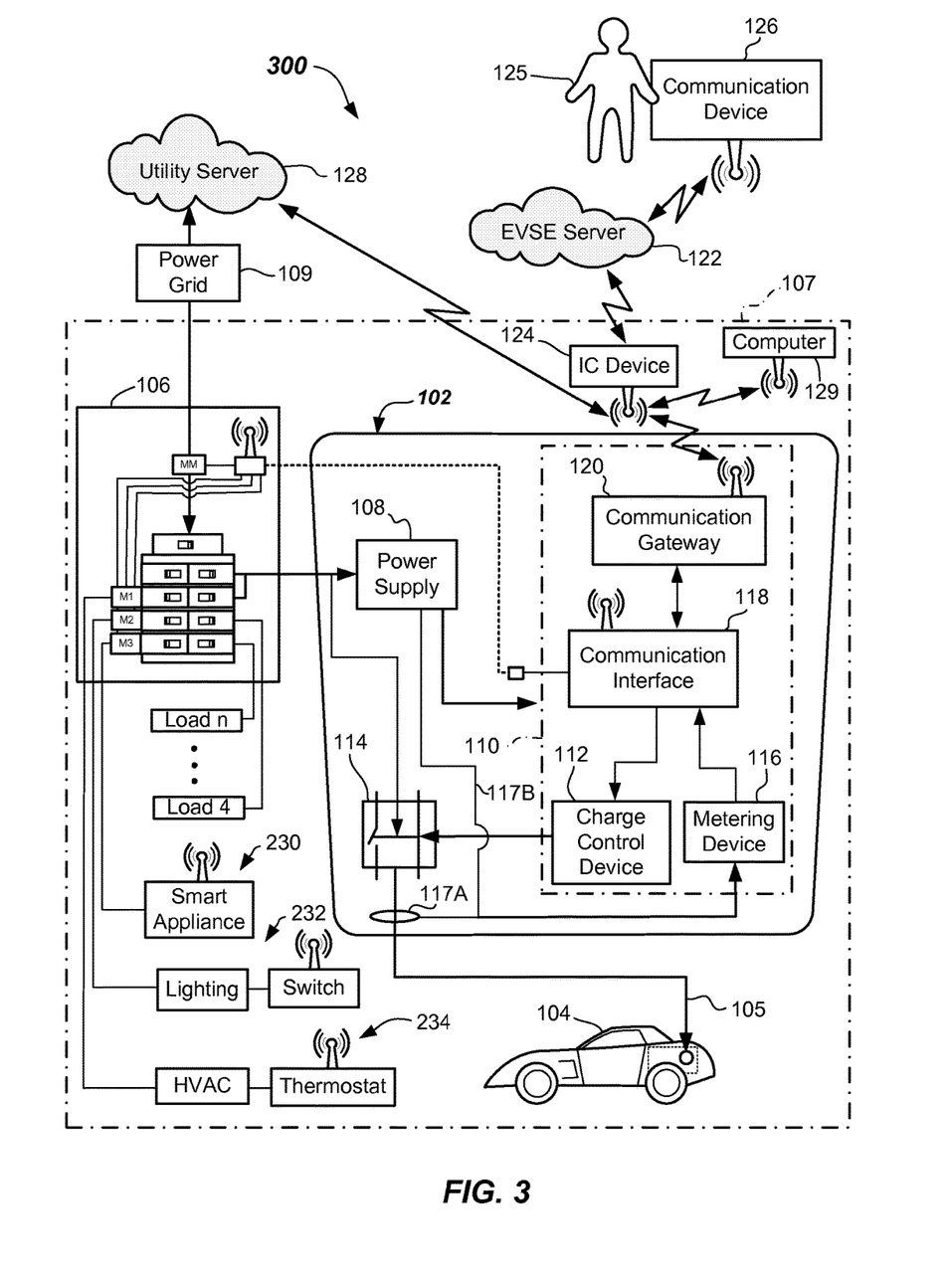
FIG. 3 illustrates a schematic diagram of an electric supply system including a smart EVSE where the EVSE can acquire measured data for one or more electrical branches coupled to a load center or total meter data for the building and wherein the EVSE may be operable to communicate with one or more smart devices coupled to a load center according to one or more embodiments.

FIG. 3 shows another embodiment of an electrical supply system 300 including a smart EVSE 102 configured for charging an EV 104. The electrical supply system 300 is the same as the electrical supply system 200 described before in FIG. 2, except that the smart EVSE 102 may also interface with one or more measurement devices (e.g., M1, M2, M3, MM) of a load center 106. The smart EVSE 102 may receive electrical load data on one or more branch circuits coupled to the load center 106 via one or more measurement devices (e.g., measurement devices M1, M2, M2). The smart EVSE 102 may also interface with a master measurement device (e.g., MM) of a load center 106 to measure and obtain the total electrical load drawn or other electrical parameters of the various branch circuits associated with the load center 106. The one or more branch circuits may couple to the one or more smart devices 230, 232, and 234. The smart EVSE 102 may interface with the one or more measurement devices MM, M1, M2, and M3 of the load center 106 by any suitable means. For example, the sending unit 244 based on any WPAN communication protocol discussed herein may be used to communicate the measured load data from MM, M1, M2, M3 to the communication interface 118. Optionally, the measured load data may be communicated by HOMEPLUG® technology (also known as Powerline or PLC), HOMEPLUG® Green PHY™, or the like.

Utilizing this received measured load data, the smart EVSE 102 may perform energy management with the one or more smart devices 230, 232, 234. The number of branch circuits, smart devices 230, 232, 234, and measurement devices may be more or less than that shown.

Thus, in response to the measured load data received from the measurement devices (e.g., MM, M1, M2, M3) by the smart EVSE 102 and control signals from a demand response program, or in response to preset priorities, energy monitoring and/or energy management may be accomplished by the electrical supply system 300.

For example, in some embodiments, the measured load data from one or more of the measurement devices (e.g., MM, M1, M2, and M3) may simply be communicated to the EVSE server 122. Thus, usage data may be available for viewing by the user 125 on the communication device 126 using the App, or available for accessing by the utility server 128.

In another example, one or more of the electrical loads coupled to the load center 106, including charging by the smart EVSE 102, may be turned OFF for short period of time (hereinafter referred to as "load rolling"). In other embodiments, peak demand power limiting may be implemented (e.g., to limit the energy consumption during peak hours) by load sharing, or operating smart devices in different power modes, or implementing priorities as discussed above.

In one or more embodiments, smart EVSE 102 may implement a monitoring and reporting function by receiving the electrical load data for some or all measurement devices (e.g., MM, M1, M2, M3) and communicating the electrical load data to the EVSE server 122. Communication may be through the communication gateway 120. Thus, the electrical load data may be accessed by the user 125 using the App. The user 125 may then send control signals through the EVSE server 122 to the smart EVSE 102 to be relayed to the one or more smart devices 230, 232, 234 to accomplish energy management in accordance with the preferences of the user 125.

In some embodiments, the smart EVSE 102 may itself detect power stability issues, such as by processing electrical data received from the master measurement device MM, or through use of data received from the sensor 117A and/or the voltage tap 117B on the power supply 108. For example, a brown-out or power surge may be determined if the voltage drops (sags) below a certain level or is measured to be outside of a desired range, if the measured current goes above a certain level or outside of a desired range, or if the frequency is outside of preset limits, or combinations of the aforementioned. In response, the smart EVSE 102 may then send a warning command to the user 125 through the communication gateway 120, and/or may automatically turn OFF or modulate loads drawn by one or more of the smart devices 230, 232, 234 and/or the smart EVSE 102 in order to protect the smart EVSE 102 and the various smart devices 230, 232, 234 and/or other connected loads against the power instability. Accordingly, not only may the smart EVSE 102 be protected, but this may possibly also improve local grid instability. In some instances, the smart EVSE 102 may have a battery backup to be able to communicate even in cases where power is lost on the local grid.

Figure 4:
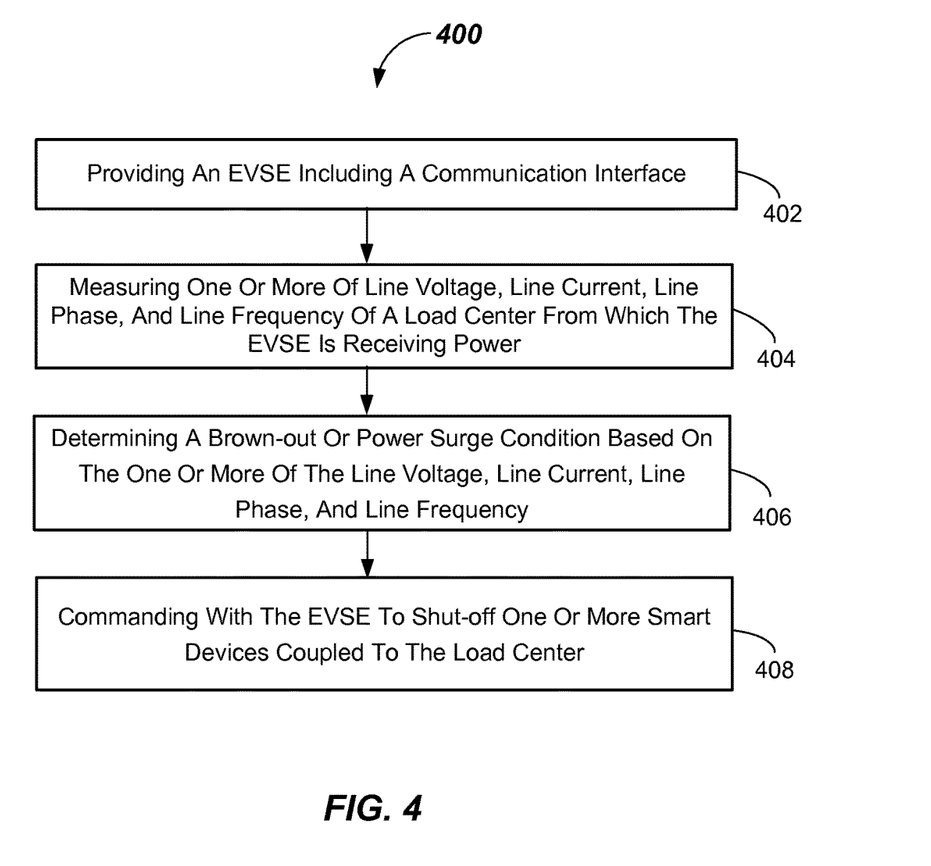
FIG. 4 illustrates a flowchart of an operation of a smart EVSE according to one or more embodiments.

A method of operating electric vehicle supply equipment (EVSE) is shown and described with reference to FIG. 4. The method 400 includes, in 402, providing an EVSE (e.g., smart EVSE 102) including a communication interface (e.g., communication interface 118), and measuring one or more of line voltage, line current, line phase, and line frequency of a load center (e.g., load center 106) from which the EVSE is receiving power in 404. Measuring line voltage, line current, line phase, and/or line frequency may be accomplished from measured data received from the master measurement device MM or from sensor 117 or voltage tap 117b.

The method 400 includes, in 406, determining a brownout or power surge condition based on one or more of the line voltage, line current, line phase, and line frequency, and, in 408, commanding with the EVSE to shut-off one or more smart devices (e.g., smart devices 230, 232, 234) coupled to the load center. Additionally, the communication interface 118 may command the charge control device 112 to stop or limit charging of the smart EVSE 102 by lowering the maximum charge level communicated to the EV 104.

It should be understood that in another method, the smart EVSE 102 may implement a demand power program by shutting or otherwise limiting power to the smart EVSE 102 and/or other smart devices coupled to the load center 106 in response to demand requests from a utility server 128.

In another method, the smart EVSE 102 may be used to send control signals to, or receive data or state information from, one or more smart devices that are coupled to the load center 106 and communicate with the EVSE server 122. Thus, in this aspect, the smart EVSE takes the place of a home automation system.

It should be readily appreciated by those persons of ordinary skill in the art that embodiments of the invention are susceptible of broad utility and application. Many embodiments and adaptations of the invention other than those described herein, as well as many variations, modifications, and equivalent arrangements, will be apparent from, or reasonably suggested by, the foregoing description thereof. Accordingly, while the invention has been described herein in detail in relation to specific embodiments, it is to be understood that this disclosure is only illustrative and presents examples of the invention and is made merely for purposes of providing a full and enabling disclosure of the invention. This disclosure is not intended to limit the invention to the particular devices, systems, or methods disclosed, but, to the contrary, the intention is to cover all modifications, equivalents, and alternatives falling within the scope of the invention.

What is claimed is:

1. An electrical supply system for an electric vehicle (EV), comprising:
    an electric vehicle supply equipment (EVSE) server configured to be accessible by a user;
    an internet access device configured to communicate with the EVSE server through an internet connection; and
    an EVSE, comprising:
        a charge control device configured to communicate a maximum charge current to be drawn by the EV,
        a metering device configured to communicate charge data comprising one or more of charge voltage, charge current drawn by the EV, charge power consumed by charging the EV, and charge energy,
        a communications interface configured to receive the charge data, and
        a communication gateway in the EVSE, the communication gateway configured to send information to the EVSE server through the internet access device including the charge data and electrical load data of electrical loads on one or more electrical branches coupled to a load center, other than an electrical branch containing the EVSE, and receive one or more charge control signals from the EVSE server; wherein:
        the EVSE is configured to send control signals directly to a first smart device from the EVSE server to adjust an energy mode of the first smart device coupled as an electrical load to the load center wherein the first smart device is not an electric vehicle.

2. The system of claim 1, wherein the communication gateway is configured to receive the one or more charge control signals as a charging schedule from the EVSE server.

3. The system of claim 1, wherein the communication gateway is configured to receive the one or more charge control signals as charging priorities from the EVSE server to be implemented in a demand response program.

4. The system of claim 1, wherein the communication gateway is configured to receive the one or more charge control signals as load control signals from the EVSE server.

5. The system of claim 1, wherein the communication gateway is configured to interface with one or more measurement devices of the load center.

6. The system of claim 1, wherein the communication gateway is configured to communicate to the EVSE server, energy usage for the one or more electrical branches coupled to the load center.

7. The system of claim 1, wherein the EVSE is configured to communicate with one or more other smart devices of branch circuits coupled to the load center, based upon:
    a user request,
    a load control signal,
    demand response data from a utility server, or
    a peak demand limiting method.

8. The system of claim 1, wherein the EVSE is configured to communicate with one or more other smart devices.

9. The system of claim 8, wherein the first smart device and the one or more other smart devices comprise one or more of a smart appliance, smart lighting, smart HVAC, smart window, smart door, and smart outlet.

10. An electric vehicle supply equipment system (EVSE), comprising:
    a charge control device configured to communicate a maximum current drawn by an electric vehicle (EV);
    a metering device configured to generate charge data of the electric vehicle of one or more of:
        charge voltage,
        charge current drawn by the EV,
        charge power consumed by charging the EV, and
        charge energy; and
    a communication gateway integral with the EVSE and configured to communicate with an EVSE server, the communication gateway further configured to provide electrical load data to the EVSE server of electrical loads on one or more electrical branches coupled to a load center, other than an electrical branch containing the EVSE; wherein:
    the EVSE is configured to interface directly with one or more smart devices and to adjust an energy mode of any one thereof, wherein none of the one or more smart devices is an electric vehicle.

11. The EVSE of claim 10, wherein the communication gateway is configured to receive one or more charge control signals from the EVSE server.

12. The EVSE of claim 10, wherein the communication gateway is configured to receive control signals from the EVSE server to be communicated to the one or more smart devices.

13. The EVSE of claim 10, wherein the communication gateway is configured to interface with one or more measurement devices of the load center, wherein the one or more measurement devices measure electrical load data on one or more branch circuits containing the one or more smart devices.

14. The EVSE of claim 13, wherein the interface with the one or more measurement devices of the load center comprises powerline communication.

15. An electric vehicle supply equipment (EVSE), comprising:
- a charge control device configured to communicate a maximum current drawn by the electric vehicle; and
- a communication gateway integral with the EVSE and operable to interface with:
  - one or more measurement devices that measure load data on one or more branch circuits of a load center,
  - a first smart device directly from the EVSE to adjust an energy mode thereof, wherein the first smart device is not an electric vehicle, and
  - an EVSE server; wherein:
  - the communication gateway is configured to provide electrical load data to the EVSE server of electrical loads on one or more electrical branches coupled to the load center, other than an electrical branch containing the EVSE.

16. The EVSE of claim 15, wherein the communication gateway is configured to interface with one or more other smart devices.

17. The EVSE of claim 15, wherein the communication gateway is configured to communicate with the one or more measurement devices and, based upon the measured data received by the communication gateway, communicate a maximum power to be consumed by the first smart device or one or more other smart devices.

18. The EVSE of claim 15, wherein the interface with the one or more measuring devices is through a communication interface coupled to the communication gateway.

19. A method of operating electric vehicle supply equipment (EVSE), comprising:
- providing an EVSE including a communication interface coupled to a communication gateway;
- providing charge current to be drawn by an electric vehicle;
- measuring one or more of line voltage, line current, line phase, and line frequency of a load center from which the EVSE is receiving power;
- determining a brown-out or power surge condition based on one or more of the line voltage, line current, line phase, and line frequency;
- providing electrical load data from the communication gateway to an EVSE server, the electrical load data based on electrical loads on one or more electrical branches coupled to the load center, other than an electrical branch containing the EVSE; and
- commanding one or more smart devices directly with the EVSE to adjust an energy mode of the one or more smart devices, which are coupled as electrical loads to the load center, wherein none of the one or more smart devices is an electric vehicle.

* * * * *